United States Patent
Liu (10) Patent No.: US 12,266,224 B2
(45) Date of Patent: Apr. 1, 2025

(54) CHESS CLOCK WITH QR CODE SCANNER AND METHODS OF USE THEREOF

(71) Applicant: Tianqi Liu, Jericho, NY (US)

(72) Inventor: Tianqi Liu, Jericho, NY (US)

( * ) Notice: Subject to any disclaimer, the term of this patent is extended or adjusted under 35 U.S.C. 154(b) by 0 days.

(21) Appl. No.: 18/053,835

(22) Filed: Nov. 9, 2022

(65) Prior Publication Data
US 2024/0153319 A1 May 9, 2024

Related U.S. Application Data (63) Continuation of application No. 18/052,504, filed on Nov. 3, 2022.

(51) Int. Cl.
*G07C 1/28* (2006.01)
*A63F 3/02* (2006.01)
*G06K 7/14* (2006.01)
*G06K 19/06* (2006.01)

(52) U.S. Cl.
CPC .......... *G07C 1/28* (2013.01); *A63F 3/02* (2013.01); *G06K 7/1413* (2013.01); *G06K 7/1417* (2013.01); *G06K 19/06037* (2013.01); *A63F 2250/1084* (2013.01)

(58) Field of Classification Search
CPC .......... A63F 2250/1084; G07C 1/28
See application file for complete search history.

(56) References Cited

U.S. PATENT DOCUMENTS

| | | | | |
|---|---|---|---|---|
| 4,884,255 A | * | 11/1989 | Fischer | G07C 1/28 368/96 |
| 5,420,830 A | * | 5/1995 | Camaratta, Jr. | G04F 10/00 368/96 |
| 6,102,293 A | * | 8/2000 | Barkan | G06F 3/0346 235/462.36 |
| 10,540,827 B1 | * | 1/2020 | Jones, Jr. | G04F 10/00 |
| 2002/0093882 A1 | * | 7/2002 | Garlock | G04F 10/00 368/96 |
| 2003/0076748 A1 | * | 4/2003 | Rustioni | G04D 7/009 368/206 |
| 2013/0064045 A1 | * | 3/2013 | Essery | G04R 20/00 368/47 |

(Continued)

FOREIGN PATENT DOCUMENTS

CN 107357161 A * 11/2017

OTHER PUBLICATIONS

Machine Translation of CN 107357161 (Year: 2017).*

*Primary Examiner* — Edwin A. Leon
*Assistant Examiner* — Jason M Collins
(74) *Attorney, Agent, or Firm* — Ergenzinger IP Law; Edward R Ergenzinger (57) ABSTRACT

A programmable digital chess clock is provided that includes a QR code, other 2D barcode, and/or 1D barcode reader for reading a QR code, other 2D barcode, and/or 1D barcode that encodes instructions for programming and setting the digital chess clock. In some embodiments, the digital chess clock includes a microcontroller operatively arranged to program and set the digital chess clock, wherein the QR code, other 2D barcode, and/or 1D barcode reader is operatively arranged to read the QR code, other 2D barcode, and/or 1D barcode and send a signal to the microcontroller to program and set the digital chess clock.

10 Claims, 4 Drawing Sheets

(56) References Cited

U.S. PATENT DOCUMENTS

| | | | |
|---|---|---|---|
| 2015/0221183 A1* | 8/2015 | Colvin | G07F 17/3211 |
| | | | 463/11 |
| 2016/0171265 A1* | 6/2016 | Lexmond | G04C 3/001 |
| | | | 235/375 |
| 2018/0225701 A1* | 8/2018 | Han | G06Q 30/0238 |
| 2019/0299100 A1* | 10/2019 | Horie | H04L 9/3247 |
| 2019/0355186 A1* | 11/2019 | Socorregut | A63F 3/00895 |
| 2020/0273017 A1* | 8/2020 | Mossoba | G06K 19/06037 |
| 2021/0388585 A1* | 12/2021 | Hamilton | E03C 1/057 |
| 2022/0036026 A1* | 2/2022 | Roux | G06K 7/1417 |
| 2022/0261813 A1* | 8/2022 | Mimassi | G06Q 20/40145 |

* cited by examiner

FIG. 1

```
{
    "$schema": "https://json-schema.org/draft/2019-09/schema",
    "$id": "ChessTimeControl/1.0.0",
    "type": "object",
    "title": "ChessTimeControl",
    "description": "Chess Time Control Schema",
    "properties": {
        "Periods": {
            "type": "array",
            "description": "Multiple time periods. Minimum one period",
            "minItems": 1,
            "uniqueItems": false,
            "items": {
                "type": "object",
                "properties": {
                    "period_length": {
                        "description": "Game length in the current period. Unit:Seconds",
                        "type": [
                            "integer",
                            "null"
                        ]
                    },
                    "increment": {
                        "description": "Time increment. Unit:Seconds",
                        "type": [
                            "integer",
                            "null"
                        ]
                    },
                    "delay": {
                        "description": "Delay for each move. Unit:Seconds",
                        "type": [
                            "integer",
                            "null"
                        ]
                    },
                    "minimum_moves": {
                        "description": "Minimum count of moves to make in the current period",
                        "type": [
                            "integer",
                            "null"
                        ]
                    }
                }
            }
        }
    },
    "additionalProperties": false,
    "required": [
        "Periods"
    ]
}
```

FIG. 2

```
1  {
2      // Time control (short form): "G/60 d10"
3      // Specification: Each side will have 60 minutes on their clock.
4      // That's the "G60" part. Each move comes with a 10 second delay.
5      // That's the "d10" part.
6      "Periods": [
7          {
8              "period_length": 3600,
9              "increment": null,
10             "delay": 10,
11             "minimum_moves": null
12         }
13     ]
14 }
```

FIG. 3

```
1  {
2      // Time control (short form): "40/80, SD/30 +30"
3      // Specification: Two periods in the game. In the first periods, each side have
4      // 80 minutes for their first 40 moves. That's the "40/80" part.
5      // Then an added 30 minutes to your clock after move 40 for the rest of the
6      // game. That's the "SD/30" part. SD stands for "Sudden Death".
7      // In both periods have 30 seconds increment after each move. That's the "+30" part.
8      "Periods": [
9          {
10             "period_length": 4800,
11             "increment": 30,
12             "delay": null,
13             "minimum_moves": 40
14         },
15         {
16             "period_length": 1800,
17             "increment": 30,
18             "delay": null,
19             "minimum_moves": null
20         }
21     ]
22 }
```

FIG. 4

CHESS CLOCK WITH QR CODE SCANNER AND METHODS OF USE THEREOF

CROSS-REFERENCE TO RELATED APPLICATION

The present invention is a Continuation of U.S. Ser. No. 18/052,504, entitled, "Chess Clock with QR Code Scanner and Methods of Use Thereof," filed on Nov. 3, 2022, and fully incorporated herein by reference.

FIELD OF THE INVENTION

A chess clock is provided that has a QR code, other 2D barcode, and/or a 1D barcode scanner for configuring one or more settings of the chess clock and methods of use thereof.

BACKGROUND OF THE INVENTION

In the mid-1800's, chess matches could last for many hours and players would sometimes try to win by simply outlasting their opponents. Timers and clocks were invented and improved upon to speed up and control the game. Analog chess clocks have given way to digital chess clocks as the application of the rules in most tournaments favor the use of digital chess clocks.

Unfortunately, digital chess clocks are notoriously difficult to set correctly. Part of the reason why has to do with the manufacturer's desire to keep costs down by minimizing the number of parts in the clock. A digital chess clock is typically set using some sequence of tapping and/or holding one or more of three buttons. This problem is made worse by the fact that the sequences vary between manufacturers or even within manufacturers from model to model. As a result, tournament start times are often delayed because players do not know or cannot remember how to set even their own digital chess clocks.

Accordingly, there is a need in the art for improved chess clocks, particularly for chess clocks with QR code, other 2D barcode, and/or 1D barcode scanners for configuring one or more settings of the chess clock and methods of use thereof.

SUMMARY OF THE INVENTION

To address the foregoing problems, in whole or in part, and/or other problems that may have been observed by persons skilled in the art, the present disclosure provides compositions and methods as described by way of example as set forth below.

A programmable digital chess clock is provided that includes a QR code, other 2D barcode, and/or 1D barcode reader for reading QR code, other 2D barcode, and/or 1D barcodes encoding instructions for programming and setting the digital chess clock.

In one embodiment, a programmable digital chess clock assembly is provided, comprising:
  a) a programmable digital chess clock comprising a microcontroller operatively arranged to program and set the digital chess clock; and
  b) a QR code, other 2D barcode, and/or 1D barcode reader operatively arranged to read a QR code, other 2D barcode, and/or 1D barcode encoding instructions for programming and setting the digital chess clock and send a signal to the microcontroller to program and set the digital chess clock.

In another embodiment, a programmable digital chess clock is provided, comprising:
  a) a housing;
  b) a display mounted in the housing and operatively arranged to display time associated with a first player's clock and operatively arranged to display time associated with a second player's clock;
  c) a first switch mounted in the housing and operatively arranged to stop the first player's clock and start the second player's clock when activated;
  d) a second switch mounted in the housing and operatively arranged to stop the second player's clock and start the first player's clock when activated;
  e) a microcontroller operatively arranged to set and control the first and second players' clocks; and
  f) a QR code, other 2D barcode, and/or 1D barcode reader in communication with the microcontroller, and operatively arranged to read a QR code, other 2D barcode, and/or 1D barcode encoding instructions for programming and setting the digital chess clock and send a signal to the microcontroller, wherein the signal is used to set the time on the first and second players' clocks.

In some aspects, the signal includes a time delay setting for each clock to be used in the playing of a chess game. In other aspects, the time delay is selected from the group consisting of Simple, Increment, Bronstein, Byo-yomi, Canadian byo-yomi, Japanese byo-yomi, and Canadian overtime. In other aspects, the signal includes a time increment setting for each clock to be used in the playing of a chess game. In other aspects, the first switch and/or the second switch is a push button. In other aspects, the first switch and/or the second switch is a touch sensor.

In other aspects, the digital chess clock further includes a memory chip in communication with the microcontroller, where the memory chip is operatively arranged to save the amount of time used by each player for each move in a chess game.

In other aspects, the microcontroller is operatively arranged to transmit data to an external device, wherein the data includes:
  i) the time remaining on each player's clock;
  ii) the number of moves made by each player; and/or
  iii) the time for each move.

In other aspects, the external device is a computer. In other aspects, the transmission of the data is done wirelessly. In other aspects, the transmission of the data is done via a cable.

A method is also provided for programming and setting a digital chess clock, comprising use of any of the programmable digital chess clocks described herein to read a QR code, other 2D barcode, and/or 1D barcode encoding instructions for programming and setting the digital chess clock.

Additional features of the invention will be or will become apparent to one with skill in the art upon examination of the following figures and detailed description. It is intended that all such additional features and advantages be included within this description, be within the scope of the invention, and be protected by the accompanying claims.

BRIEF DESCRIPTION OF THE DRAWINGS

Having thus described the subject matter of the present invention in general terms, reference will now be made to the accompanying drawings, which are not necessarily drawn to scale, and wherein:

DETAILED DESCRIPTION

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated drawings. All illustrations of the drawings are for the purpose of describing selected versions of the present invention and are not intended to limit the scope of the present invention. Therefore, it is to be understood that the subject matter of the present invention is not to be limited to the specific embodiments disclosed and that modifications and other embodiments are intended to be included within the scope of the appended claims.

Chess Clock with OR Code, Other 2D Barcode, and/or 1D Barcode Scanner and Methods of Use Thereof A programmable digital chess clock is provided that includes a QR code, other 2D barcode, and/or 1D barcode reader for reading QR code, other 2D barcode, and/or 1D barcodes encoding instructions for programming and setting the digital chess clock.

In one embodiment, a programmable digital chess clock assembly is provided, comprising:
a) a programmable digital chess clock comprising a microcontroller operatively arranged to program and set the digital chess clock; and
b) a QR code, other 2D barcode, and/or 1D barcode reader operatively arranged to read a QR code, other 2D barcode, and/or 1D barcode encoding instructions for programming and setting the digital chess clock and send a signal to the microcontroller to program and set the digital chess clock.

In another embodiment, a programmable digital chess clock is provided, comprising:
a) a housing;
b) a display mounted in the housing and operatively arranged to display time associated with a first player's clock and operatively arranged to display time associated with a second player's clock;
c) a first switch mounted in the housing and operatively arranged to stop the first player's clock and start the second player's clock when activated;
d) a second switch mounted in the housing and operatively arranged to stop the second player's clock and start the first player's clock when activated;
e) a microcontroller operatively arranged to set and control the first and second players' clocks; and
f) a QR code, other 2D barcode, and/or 1D barcode reader in communication with the microcontroller, and operatively arranged to read a QR code, other 2D barcode, and/or 1D barcode encoding instructions for programming and setting the digital chess clock and send a signal to the microcontroller, wherein the signal is used to set the time on the first and second players' clocks.

In some aspects, the signal includes a time delay setting for each clock to be used in the playing of a chess game. In other aspects, the time delay is selected from the group consisting of Simple, Increment, Bronstein, Byo-yomi, Canadian byo-yomi, Japanese byo-yomi, and Canadian overtime. In other aspects, the signal includes a time increment setting for each clock to be used in the playing of a chess game. In other aspects, the first switch and/or the second switch is a push button. In other aspects, the first switch and/or the second switch is a touch sensor.

In other aspects, the digital chess clock further includes a memory chip in communication with the microcontroller, where the memory chip is operatively arranged to save the amount of time used by each player for each move in a chess game.

In other aspects, the microcontroller is operatively arranged to transmit data to an external device, wherein the data includes:
  i) the time remaining on each player's clock;
  ii) the number of moves made by each player; and/or
  iii) the time for each move.

In other aspects, the external device is a computer. In other aspects, the transmission of the data is done wirelessly. In other aspects, the transmission of the data is done via a cable.

A method is also provided for programming and setting a digital chess clock, comprising use of any of the programmable digital chess clocks described herein to read a QR code, other 2D barcode, and/or 1D barcode encoding instructions for programming and setting the digital chess clock.

Figure 1:
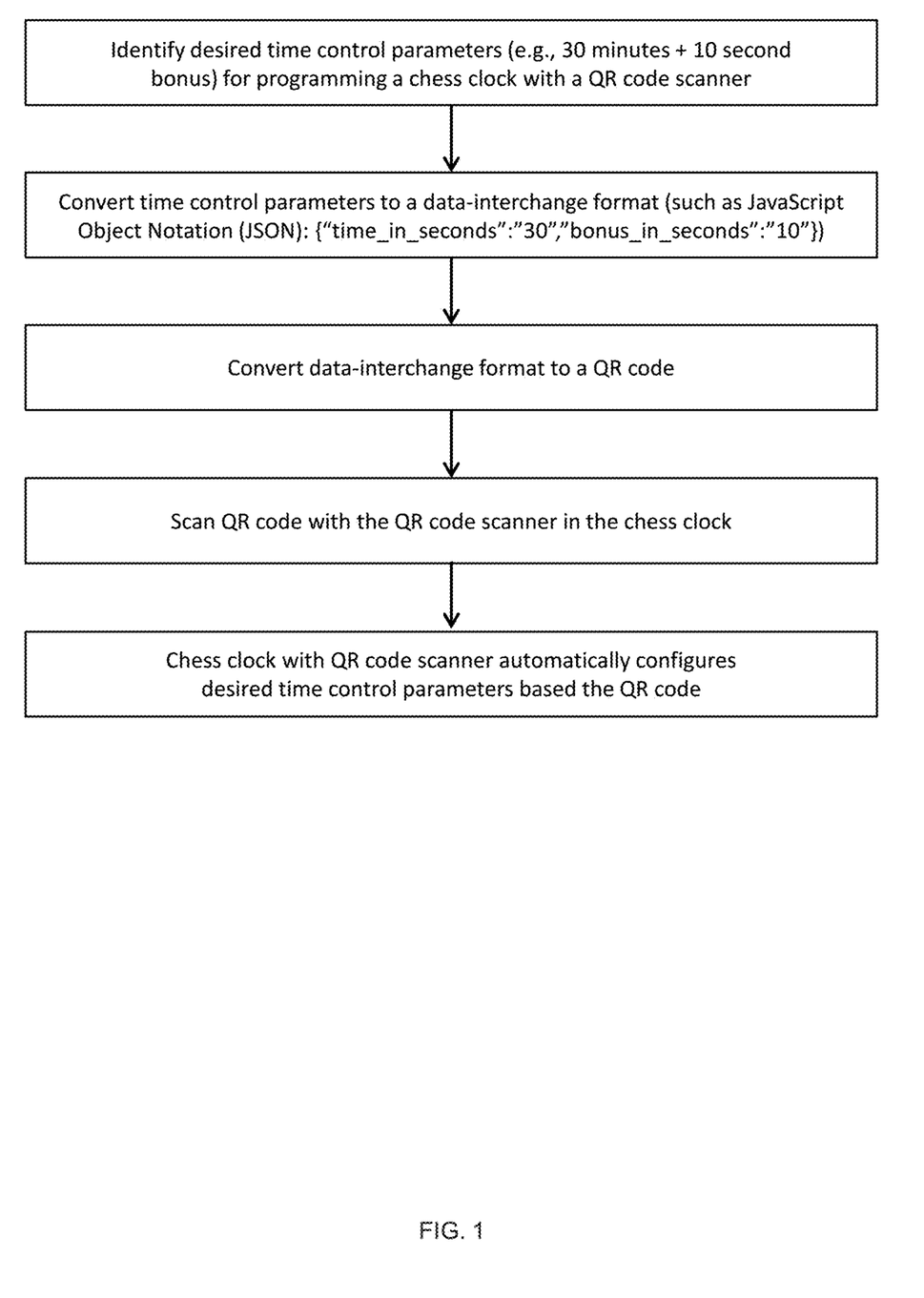
FIG. 1 shows a flow diagram of a method for using a chess clock with QR scanner in accordance with an embodiment of the invention.

Turning now to FIG. 1, a flow diagram is shown of a method for using a chess clock with QR scanner in accordance with an embodiment of the invention.

Figure 2:
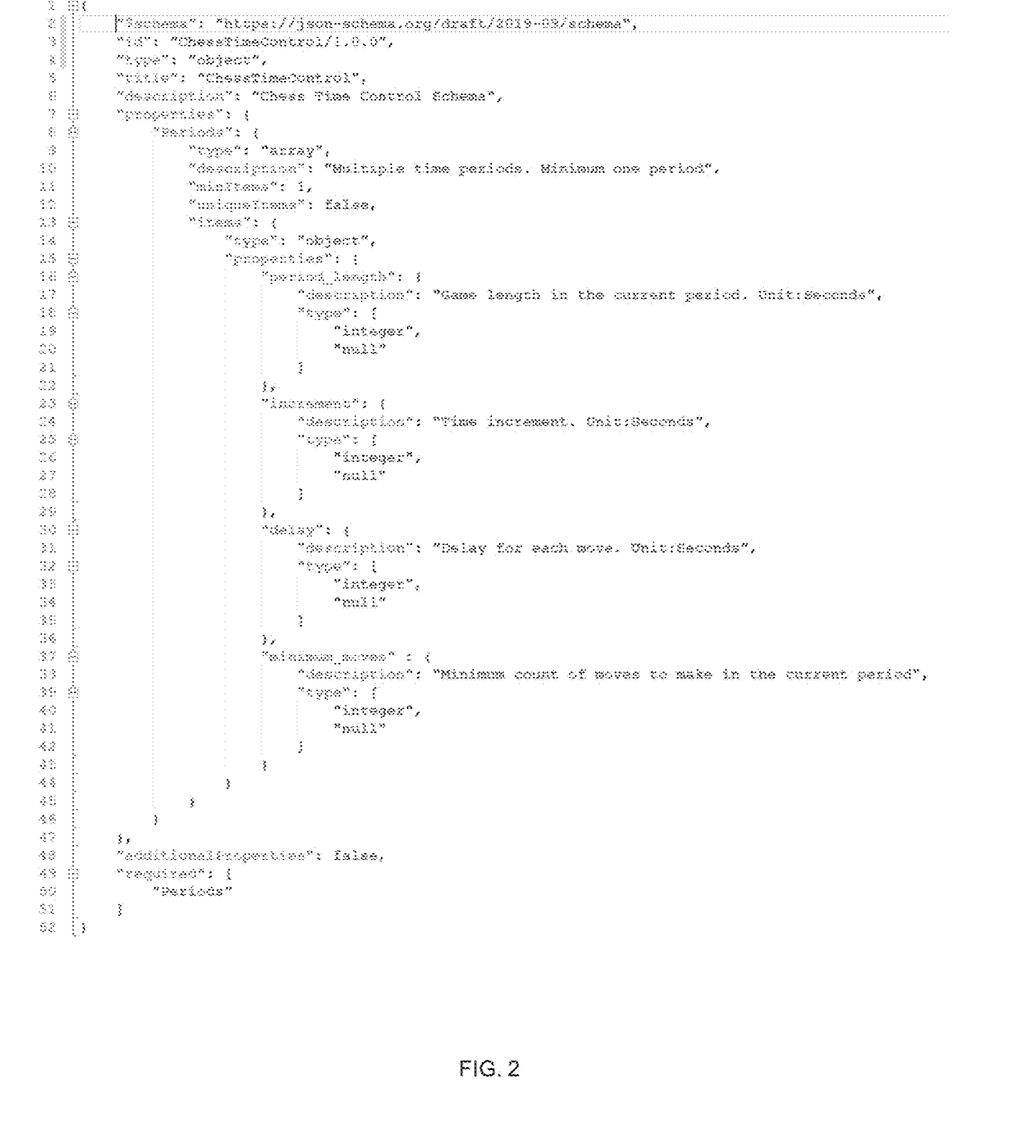
FIG. 2 shows a JavaScript Object Notation (JSON) data-interchange format schema for converting time control parameters used in mainstream chess tournaments.

Turning now to FIG. 2, a JavaScript Object Notation (JSON) schema is shown for converting time control parameters used in mainstream chess tournaments into a JSON data-interchange format. Other data interchange formats suitable for use within the present invention include XML, YAML, BSON, MessagePack, Protobuf, Avro, MongoDB, and OData.

Figure 3:
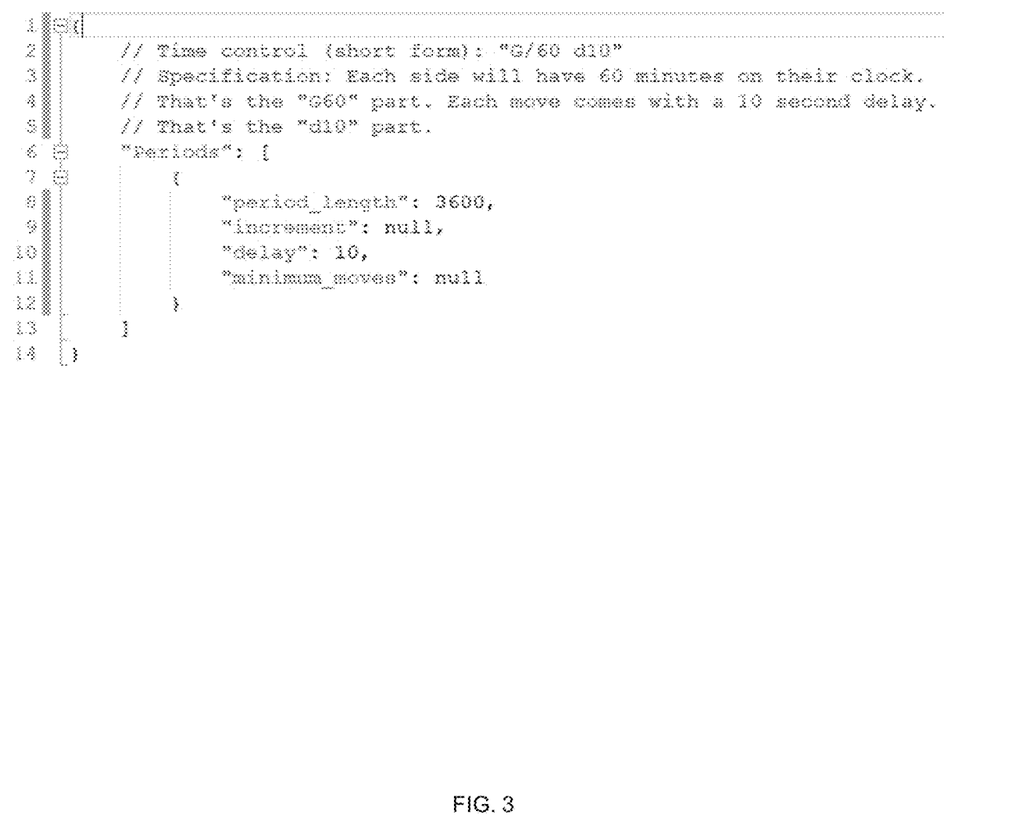
FIG. 3 shows a JSON schema for a 40/80 SD/30+30 time control setting, meaning players have 80 minutes for their first 40 moves, then a sudden death (SD period of 30 minutes for the rest of the game with every move having a 30-second increment.

Turning now to FIG. 3, a JSON schema is shown for a 40/80 SD/30+30 time control setting, meaning players have 80 minutes for their first 40 moves, then a sudden death (SD) period of 30 minutes for the rest of the game with every move having a 30-second increment.

Figure 4:
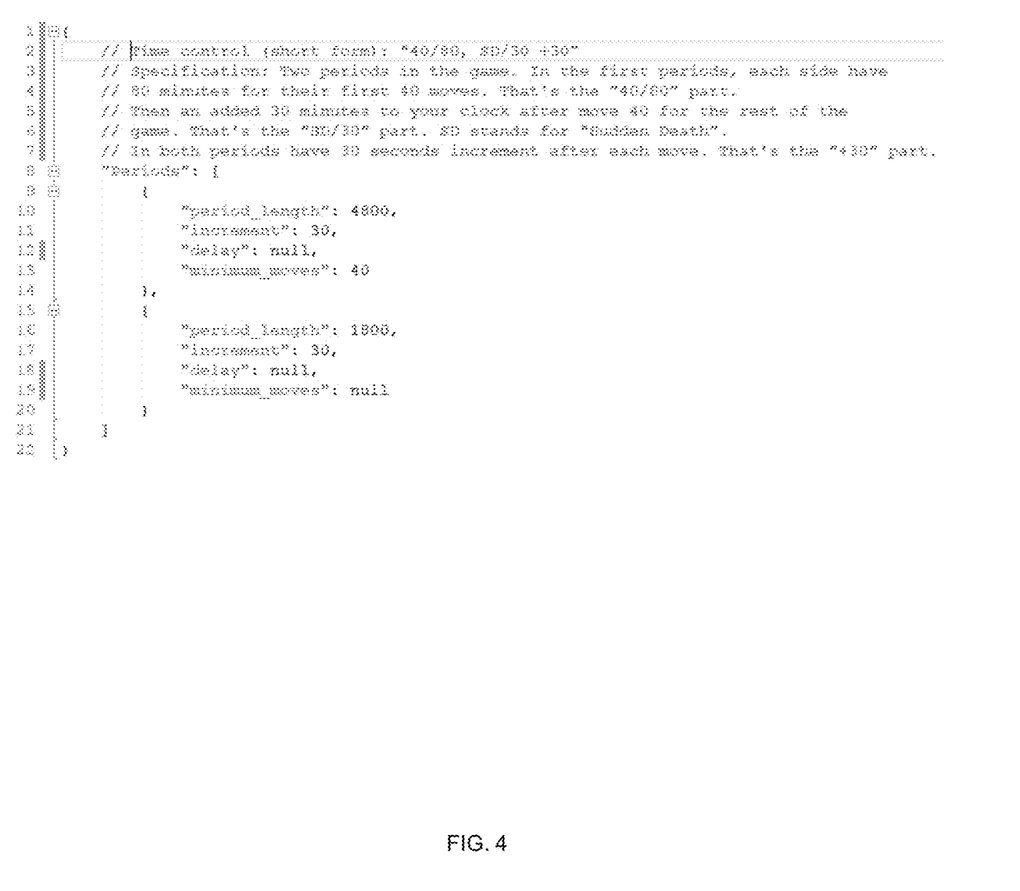
FIG. 4 shows a JSON schema for a G/60 d10 time control setting, meaning players have 60 minutes for the entire game with a 10 second delay for each move.

Turning now to FIG. 4, a JSON schema is shown for a G/60 d10 time control setting, meaning players have 60 minutes for the entire game with a 10 second delay for each move.

Definitions

A "barcode" is a linear one-dimensional (1D) code that features a series of bars and spaces (typically black lines of varying thickness separated by white spaces of varying sizes). The sequence of bars and spaces are optical labels that are machine-readable (e.g., by a barcode scanner) and encode data (typically numbers and symbols, though alphanumeric variations exist as well).

Two-dimensional, (or 2D) barcodes systematically represent data using two-dimensional symbols and shapes. Although similar to linear 1D barcodes, 2D barcodes can represent more data per unit area.

A type of 2D barcode is the "Quick Response code" or "QR code." A QR code is a matrix-based 2D barcode capable of encoding large amounts of data. Originally developed for tracking parts during vehicle manufacturing, QR codes may be used for many other purposes. QR codes may use four standardized encoding modes (numeric, alphanumeric, byte/binary, and kanji) to efficiently store data. A QR code can be read by a variety of decoding devices, including dedicated QR code readers/scanners and smartphones with applications for reading QR codes.

The term "time control" as used herein is intended to mean the format and rules which define the time allowed to play a particular game of chess. and rules which define the time allowed to play a particular game of chess. For example, each player must make a certain number of moves, all moves, or all remaining moves in an allotted period of time, these factors being specified in advance to the players by a tournament director. In a non-sudden death time control, if both players complete the required moves in the allotted time, a new period begins. Each such time period is called a time control. Time controls appear in tournament publicity as number of moves (#), slash (/), time in minutes: #/mm. For instance, if each player must make 40 moves in 1½ hours, this is abbreviated 40/90. In a sudden death time control, the designation "SD" is used. For example, 40/120 SD/60 indicates that 40 moves must be made by each player in two hours (120 minutes) followed by the rest of the moves in the game in one hour (60 minutes). If the time control indicates a delay (pause) time, the abbreviation d/ # is used, where # is the delay time in seconds. For example, d/5 indicates a time delay of 5 seconds, which means that the clock display will pause for 5 seconds before starting to decrement. If the time control indicates an incremental (added) time, the abbreviation inc/#(or +#) is used, where the added time # is the incremental time in seconds. For example, inc/30 or +30 indicates an incremental time of 30 seconds, which means that 30 seconds will be added to a player's clock at the conclusion of a move, once the player touches her sensor button.

Examples of various time modes/controls used in timing chess games include sudden death, simple delay, Increment delay, and Bronstein delay:

1) Sudden death: In this mode, each player's clock is set for a specific time period (e.g., 5 minutes, 10 minutes, 50 minutes, etc.) (Each player may have the same amount of time, or one player may have more or less time than his opponent.) If a player runs out of time before he checkmates his opponent, he loses the game. Typically, each player's clock counts down from a certain number until the display reaches zero, at which point the displays may freeze, or flash/blink, or an alarm may sound to indicate that one player has run out of time.

2) Simple delay: Also known as "US delay," in this mode, the clock is set for a particular delay. For example, one popular time delay is five (5) seconds. In this mode, when a player hits his button, his clock is stopped. Five seconds later, his opponent's clock begins to decrement. The time associated with the delay is not accumulated. A player either uses all or some of his delay time, but doesn't get to "bank it" or accumulate it to use at another point in the game. This mode is popular among chess players and in tournaments since it guarantees that a player will always have five (5) seconds to make each move. Prior to the implementation of the delay mode, many chess players lamented losing on time, as it was very difficult when in time trouble to concentrate both on the board and on the clock. These days, almost all serious chess players have developed an innate sense of how long they have to move when playing a game with a five (5) second delay. It should be appreciated that the net effect of a simple delay time mode is exactly the same as that of the Bronstein mode described infra, where the difference is that in simple time delay, the delay occurs prior to a move being made whereas in Bronstein mode the delay is added after the fact.

3) Increment: Also known as "bonus" or "Fischer," in this mode, a specified time increment is added to a player's clock before he makes his move. Time can be accumulated, so if the player moves within the delay period, his remaining time actually increases. For example, if the delay time is five seconds, and a player has four seconds left on his clock, as soon as his opponent moves, he receives the increment and has nine seconds to make a move. If he takes two seconds to move, on the start of his next move he has seven seconds. There is also a variant of this time control that adds the delay after a player makes his move ("Fischer after"), so the delay is added to the player's remaining time and is available for his next move. If, however, time runs out during his move, the game ends without the delay time being added. This variant prevents the player who is in time-trouble to take advantage of the extra-time.

4) Bronstein: In this mode, the increment is always added after the move. But unlike Increment, the maximum increment is not always added. If a player expends more than the specified increment, then the entire increment is added to the player's clock. But if a player has moved faster than the time increment, only the exact amount of time expended by the player is added. For example, if the delay is five seconds, the player has ten seconds left in his clock before his turn and during his turn he spends three seconds, after he presses the clock button to indicate the end of his turn, his clock increases by only three seconds (not five).

5) Byo-yomi: In this mode, after the main time is depleted, a player has a certain number of periods (for example five periods, each of thirty seconds). If a move is completed before the time expires, the time period resets and restarts the next turn. If a move is not completed within a time period, the time period will expire, and the next time period begins. This is written as maintime+number of byo-yomi time periods of byo-yomi time period. Using up the last period means that the player has lost on time. In some systems, there is no main time; instead, the time used is rounded up to the nearest whole increment, such as one minute, and the actual counting of time occurs toward the end of one player's time. A typical byo-yomi time control is "60 minutes+30 seconds byo-yomi", which means that each player may make as many or as few moves as they choose during their first 60 minutes of thinking time, but after the hour is exhausted, they must make each move in thirty seconds or less. To enforce byo-yomi, a third person or a game clock with a byo-yomi option is necessary.

6) Canadian byo-yomi: Canadian byo-yomi is a variant of byo-yomi which imposes a certain average speed of play, but allows the player to spend more time to ponder on difficult moves.

7) Japanese byo-yomi: Japanese byo-yomi is a variant of byo-yomi in which several byo-yomi periods are combined in one move per period.

8) Canadian overtime: In this mode, when a player uses all of their main time, the player must make a certain number of moves within a certain period of time (e.g., twenty moves within five minutes). If all the moves are made in time, then another period of overtime starts. If all the moves are not made in time, the player has lost on time. In Progressive Canadian Overtime the required rate of play alters in additional overtime periods (e.g., 1 hour+10 in 5, 20 in 5, 30 in 5, 40 in 5 etc.).

It will be appreciated that various aspects of the invention may be embodied as a method, system, computer readable medium, and/or computer program product. Aspects of the invention may take the form of hardware embodiments, software embodiments (including firmware, resident software, micro-code, etc.), or embodiments combining software and hardware aspects that may all generally be referred to herein as a "circuit," "module," or "system." Furthermore, the methods of the invention may take the form of a computer program product on a computer-usable storage medium having computer-usable program code embodied in the medium.

Any suitable computer useable medium may be utilized for software aspects of the invention. The computer-usable or computer-readable medium may be, for example but not limited to, an electronic, magnetic, optical, electromagnetic, infrared, or semiconductor system, apparatus, device, or propagation medium. The computer readable medium may include transitory and/or non-transitory embodiments. More specific embodiments (a non-exhaustive list) of the computer-readable medium would include some or all of the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Program code for carrying out operations of the invention may be written in an object-oriented programming language such as Java, Smalltalk, C++ or the like. However, the program code for carrying out operations of the invention may also be written in conventional procedural programming languages, such as the "C" programming language or similar programming languages. The program code may be executed by a processor, application specific integrated circuit (ASIC), or other component that executes the program code. The program code may be simply referred to as a software application that is stored in memory (such as the computer readable medium discussed above). The program code may cause the processor (or any processor-controlled device) to produce a graphical user interface ("GUI"). The graphical user interface may be visually produced on a display device, yet the graphical user interface may also have audible features. The program code, however, may operate in any processor-controlled device, such as a computer, server, personal digital assistant, phone, television, or any processor-controlled device utilizing the processor and/or a digital signal processor.

The program code may locally and/or remotely execute. The program code, for example, may be entirely or partially stored in local memory of the processor-controlled device. The program code, however, may also be at least partially remotely stored, accessed, and downloaded to the processor-controlled device. A user's computer, for example, may entirely execute the program code or only partly execute the program code. The program code may be a stand-alone software package that is at least partly on the user's computer and/or partly executed on a remote computer or entirely on a remote computer or server. In the latter scenario, the remote computer may be connected to the user's computer through a communications network.

The invention may be applied regardless of networking environment. The communications network may be a cable network operating in the radio-frequency domain and/or the Internet Protocol (IP) domain. The communications network, however, may also include a distributed computing network, such as the Internet (sometimes alternatively known as the "World Wide Web"), an intranet, a local-area network (LAN), and/or a wide-area network (WAN). The communications network may include coaxial cables, copper wires, fiber optic lines, and/or hybrid-coaxial lines. The communications network includes wireless portions utilizing any portion of the electromagnetic spectrum and any signaling standard (such as the IEEE 802 family of standards, GSM/CDMA/TDMA or any cellular standard, and/or the ISM band). The communications network may even include powerline portions, in which signals are communicated via electrical wiring. The invention may be applied to any wireless/wireline communications network, regardless of physical componentry, physical configuration, or communications standard(s).

In some aspects, wireless communication interfaces may include, but are not limited to, an Intranet connection, Internet, Personal Area Networks (PANs) for the exchange of data over short distances, e.g., using short-wavelength radio transmissions in the industrial, scientific, and medical (ISM) band ISM band from 2400-2480 MHz) from fixed and mobile devices (e.g., Bluetooth® technology), wireless fidelity (Wi-Fi), Wi-Max, IEEE 802.11 technology, radio frequency (RF), Infrared Data Association (IrDA) compatible protocols, Local Area Networks (LANs), Wide Area Networks (WANs), Shared Wireless Access Protocol (SWAP), Zigbee, Near-Field Communication (NFC), LiFi, 5G, any combinations thereof, and other types of wireless networking protocols.

Certain aspects of invention are described with reference to various methods and method steps. It will be understood that each method step can be implemented by the program code and/or by machine instructions. The program code and/or the machine instructions may create means for implementing the functions/acts specified in the methods.

The program code may also be stored in a computer-readable memory that can direct the processor, computer, or other programmable data processing apparatus to function in a particular manner, such that the program code stored in the computer-readable memory produce or transform an article of manufacture including instruction means which implement various aspects of the method steps.

The program code may also be loaded onto a computer or other programmable data processing apparatus to cause a series of operational steps to be performed to produce a processor/computer implemented process such that the program code provides steps for implementing various functions/acts specified in the methods of the invention.

Any of a variety of light sources may be used to provide the excitation and/or imaging light, including but not limited to, tungsten lamps, tungsten-halogen lamps, arc lamps, lasers, light emitting diodes (LEDs), or laser diodes.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount, or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art. Although the foregoing subject matter has been described in some detail by way of illustration and example for purposes of clarity of understanding, it will be understood by those skilled in the art that certain changes and modifications can be practiced within the scope of the appended claims.

The invention claimed is:

1. A programmable digital chess clock assembly, comprising:
  a) a programmable digital chess clock comprising a microcontroller operatively arranged to program and set the digital chess clock without transmitting radio frequency data to or receiving radio frequeny data from an external device; and
  b) a QR code, other 2D barcode, and/or 1D barcode reader operatively arranged to read a QR code, other 2D barcode, and/or 1D barcode encoding instructions for programming and setting the digital chess clock and send a signal to the microcontroller to program and set the digital chess clock; wherein the QR code, other 2D barcode, and/or 1D barcode are configured to encode desired time control parameters converted from a JavaScript Object Notation (JSON) data-interchange format;

wherein the microcontroller is further operatively arranged to program and set the digital chess clock based only on the instructions from the QR code, other 2D barcode, and/or 1D barcode reader and not from tapping and/or holding one or more buttons on the digital chess clock.

2. A method for programming and setting a digital chess clock, comprising use of the programmable digital chess clock of claim 1 to read a QR code, other 2D barcode, and/or 1D barcode encoding instructions for programming and setting the digital chess clock.

3. A programmable digital chess clock, comprising:
  a) a housing;
  b) a display mounted in the housing and operatively arranged to display time associated with a first player's clock and operatively arranged to display time associated with a second player's clock;

c) a first switch mounted in the housing and operatively arranged to stop the first player's clock and start the second player's clock when activated;
d) a second switch mounted in the housing and operatively arranged to stop the second player's clock and start the first player's clock when activated;
e) a microcontroller operatively arranged to set and control the first and second players' clocks without transmitting radio frequency data to or receiving radio frequency data from an external device; and
f) a QR code, other 2D barcode, and/or 1D barcode reader in communication with the microcontroller, and operatively arranged to read a QR code, other 2D barcode, and/or 1D barcode encoding instructions for programming and setting the digital chess clock and send a signal to the microcontroller, wherein the QR code, other 2D barcode, and/or 1D barcode are configured to encode desired time control parameters converted from a JavaScript Object Notation (JSON) data-interchange format and wherein the signal is used to set the time on the first and second players' clocks;

wherein the microcontroller is further operatively arranged to program and set the digital chess clock based only on the instructions from the QR code, other 2D barcode, and/or 1D barcode reader and not from tapping and/or holding one or more buttons on the digital chess clock.

4. The programmable digital chess clock of claim 3, wherein the signal includes a time delay setting for each clock to be used in the playing of a chess game.

5. The programmable digital chess clock of claim 4, wherein the time delay is selected from the group consisting of Simple, Increment, Bronstein, Byo-yomi, Canadian byo-yomi, Japanese byo-yomi, and Canadian overtime.

6. The programmable digital chess clock of claim 3, wherein the signal includes a time increment setting for each clock to be used in the playing of a chess game.

7. The programmable digital chess clock of claim 3, wherein the first switch and/or the second switch is a push button.

8. The programmable digital chess clock of claim 3, wherein the first switch and/or the second switch is a touch sensor.

9. The programmable digital chess clock of claim 3, further comprising a memory chip in communication with the microcontroller, the memory chip operatively arranged to save the amount of time used by each player for each move in a chess game.

10. A method for programming and setting a digital chess clock, comprising use of the programmable digital chess clock of claim 3 to read a QR code, other 2D barcode, and/or 1D barcode encoding instructions for programming and setting the digital chess clock.

* * * * *